United States Patent [19]

Pollmann et al.

[11] Patent Number: 4,588,568

[45] Date of Patent: May 13, 1986

[54] METHOD OF BINDING SULFUR COMPOUNDS, WHICH RESULT AS REACTION PRODUCTS DURING THE COMBUSTION OF SULFUR-CONTAINING FUELS, BY ADDITION OF ADDITIVES

[75] Inventors: Siegfried Pollmann; Gabriele Raupach, both of Gummersbach, Fed. Rep. of Germany

[73] Assignee: L. & C. Steinmüller GmbH, Gummersbach, Fed. Rep. of Germany

[21] Appl. No.: 582,928

[22] Filed: Feb. 23, 1984

[30] Foreign Application Priority Data

Feb. 26, 1983 [DE] Fed. Rep. of Germany ....... 3306795

[51] Int. Cl.$^4$ ............................ C01B 17/00; B01J 8/00
[52] U.S. Cl. .................................... 423/244; 423/242; 110/343; 110/345
[58] Field of Search .......... 423/242 A, 242 R, 244 A, 423/244 R; 110/343, 345

[56] References Cited

U.S. PATENT DOCUMENTS

| | | | |
|---|---|---|---|
| 931,515 | 8/1909 | Sprague | 423/244 |
| 3,823,676 | 7/1974 | Cook et al. | 110/1 J |
| 3,977,844 | 8/1976 | Van Slyke | 423/244 |
| 4,183,330 | 1/1980 | Bryers et al. | 122/4 D |
| 4,324,770 | 4/1982 | Bakke | 423/242 |

FOREIGN PATENT DOCUMENTS

| | | |
|---|---|---|
| 2539546 | 3/1977 | Fed. Rep. of Germany . |
| 2807076 | 6/1977 | Fed. Rep. of Germany . |
| 2932676 | 2/1981 | Fed. Rep. of Germany . |
| 3306795 | 12/1983 | Fed. Rep. of Germany . |
| 602166 | 7/1978 | Switzerland ........................ 423/244 |
| 1356996 | 6/1974 | United Kingdom . |
| 1425818 | 2/1976 | United Kingdom . |

OTHER PUBLICATIONS

Machine Market, Wurzburg 1979, vol. 85, No. 32, p. 621.
Wickert: "Combustion, Surface Contamination Corrosion", 1969.

Primary Examiner—Gregory A. Heller
Attorney, Agent, or Firm—Becker & Becker, Inc.

[57] ABSTRACT

A method of binding sulfur compounds, which result as react products during the combustion of sulfur-containing fuels in firing equipment, by the addition of additives. A mixture of alkali carbonate and an alkaline earth oxide, for example a mixture of sodium carbonate and magnesium oxide, are used as the additive. Such a mixture may include approximately one part by weight sodium carbonate and approximately two parts by weight magnesium oxide.

8 Claims, No Drawings

METHOD OF BINDING SULFUR COMPOUNDS, WHICH RESULT AS REACTION PRODUCTS DURING THE COMBUSTION OF SULFUR-CONTAINING FUELS, BY ADDITION OF ADDITIVES

BACKGROUND OF THE INVENTION

The present invention relates to a method of binding sulfur compounds, which result as reaction products during the combustion of sulfur-containing fuels in firing equipment, by the addition of additives.

DESCRIPTION OF THE PRIOR ART

Additives are used for binding sulfur compounds which result as reaction products during the combustion of sulfur-containing fuels in firing equipment. Pursuant to the state of the art, the addition of additives can be effected in various ways.

A first procedure consists of adding the additive to the fuel prior to combustion, i.e., additive and fuel are mixed and subsequently burned.

A second procedure consists of adding the additives to the reaction products of the fuel via flue gas. The form which the addition takes, and the location of the addition, can vary. The location of the addition of the additive to the reaction products of the combustion is a function of the composition of the additive. This is because the reactivity of the heretofore known and utilized additives is temperature dependent, so that, for example, an additive which only reacts with the reaction products of the combustion at high temperatures can be introduced advantageously only at those locations where these temperature conditions exist. The same is true for additives having their optimum reaction in the medium or low temperature ranges.

A method is known (German Pat. No. 28 07 076), according to which the additive is mixed with the fuel prior to combustion. This additive is a calcium oxide. Brown coal or lignite serves as the fuel. This calcium oxide additive has optimum reaction thereof in the middle temperature range, and can therefore can be used advantageously only for lignite, and in fact only in conjunction with a mixture, since lignite, in contrast to bituminous coal, has a low temperature level during combustion.

A further method is known (U.S. Pat. No. 3,823,676 Cook et al issued July 16, 1974), which utilizes sodium carbonate as the additive. This sodium carbonate additive is added to the fuel-bituminous coal prior to or after the pulverization. With bituminous coal, this sodium carbonate additive achieves optimum reaction thereof in the high temperature range. A drawback to the utilization of this sodium carbonate additive is the fact that the additive, in conjunction with the fuel ash or slag, produces severe contamination and slag corrosion in the combustion chamber, since the melting point of the slag is considerably reduced as a result of the sodium compounds.

In contrast to adding the additive to the fuel prior to combustion, there is known, also as previously mentioned, to add the additive to the reaction products. This can take place by adding the additive above the burner disposed in the combustion chamber, or at a point further downstream in the direction of flow of flue gas of a steam generator. However, the difficulty in this connection is the very uniform distribution of the additive over the entire stream of flue gas in order to achieve an economical utilization of the additive. These difficulties are avoided by a known method (U.S. Pat. No. 4,331,638, Michelfedler issued May 25, 1982 which belongs to the assignee of the present application), by adding the additive by means of a carrier medium into the periphery of the respective flames of the burners. With these measures, the mixing energy, which in part produces the combustion of the fuel, is used also in order to bring about a uniform distribution of the additive in the resulting combustion products. The additives used in this known method are metal oxides and metal hydroxides, such as oxides of the metals sodium, potassium, aluminum, barium, cadmium, calcium, copper, iron, lead, magnesium, manganese, and zinc. Furthermore, calcium carbonate, magnesium carbonate, and dolomite in pulverized form also can be used as the additive in this known method. These additives have their optimum reaction in the middle temperature range, so that with the use in this form, the additive is not fully used; this is all the more so because the reactivity of a portion of these additives is reduced by the effect of high temperatures when mixed in the region of the flame. Even if the type of introduction and the location of introduction of the additive are optimized, nevertheless the affect during the mixing of the additive with the reaction products of the fuel, especially in the high temperature ranges, is unsatisfactory, which concerns the reactivity.

An object of the present invention, with methods for binding sulfur compounds which result as reaction products during the combustion of sulfur-containing fuels in firing equipment, is to utilize such additives which have a better sulfur-binding degree, even at high temperatures than with the known additives, and to determine the location of introduction of such additives which is optimum for the reaction.

This object, and other objects and advantages of the present invention, will appear more clearly from the following specification.

SUMMARY OF THE INVENTION AND DESCRIPTION OF PREFERRED EMBODIMENTS

The method of the present invention is characterized primarily in that as the additive there is used a mixture of alkali carbonate and an alkaline earth oxide, for example a mixture of sodium carbonate and magnesium oxide.

This additive mixture of sodium carbonate and magnesium oxide has proven to be particularly advantageous, and can comprise approximately one part by weight sodium carbonate and approximately two parts by weight magnesium oxide. The use of a mixture of alkali carbonate and alkaline earth oxide is advantageous in that the alkaline earth oxides, due to their known high melting point in conjunction with the alkali carbonates, do not lead to operation-disturbing slag corrosion of the combustion chamber and the heating surfaces. Contamination which occurs is porous in nature and therefore easier to remove during operation with known cleaning and scrubbing apparatus.

Various possibilities for the form of the addition are within the scope of the inventive method. For example, the additive mixture can be added with the fuel prior to the burning. Pursuant to another specific embodiment of the present invention, the additive mixture also can be added to the firing equipment together with the oxygen carrier. It is possible also to add the additive mixture to the reaction products of the combustion by means of a carrier medium.

When a carrier fluid is used, there is further possible pursuant to the present invention to add recycled flue dust to the additive mixture at a temperature of less than 1200° C. At this temperature there is avoided the danger that sulfur compounds already bound in the flue dust will again be released. Furthermore, the additional addition of flue dust to the reaction products assures that the not yet utilized portion of reactive additive is used for the binding of sulfur.

Not only the form of addition but also the location of addition of the additive are important for the inventive method. The location of the addition for achieving an optimum reaction of the additive with the reaction products of the fuel is a function of the choice of firing equipment.

Pursuant to a further proposal of the present invention, with burner firing, the additive mixture is introduced into the periphery of the respective flames. The type of introduction can vary with the choice of the location of addition.

Pursuant to one inventive proposal, the additive mixture can be added with a portion of the oxygen carrier.

Pursuant to a further proposal, it is possible to add the additive mixture with a mixture of oxygen carrier and flue gas.

Other possibilities include adding the additive mixture with pure flue gas or with water.

The inventive method also can be utilized in conjunction with a fluidized bed firing. In this instance, the additive mixture is added directly into the bed.

As a variation to adding the additive mixture directly into the bed when a fluidized bed firing is used, there is also inventively possible the introduction of the additive mixture into the bed together with recycled material.

When the inventive method is utilized with grate firing, the additive mixture is added with the secondary or by-pass air.

The present invention is, of course, in no way restricted to the specific disclosure of the specification, but also encompasses any modifications within the scope of the appended claims.

What we claim is:

1. A method of binding sulfur compounds consisting essentially of sulfur dioxide and traces of sulfur trioxide which result as reaction products during the combustion of sulfur-containing fuels in firing equipment; said method comprising the step of adding an additive in the form of a mixture consisting of sodium carbonate and an magnesium oxide in predetermined proportion by weight relative to each other including a lesser amount of sodium carbonate part by weight than that of magnesium oxide having effectiveness thereof evolve collectively in a relatively high temperature region with which there is avoided any danger that sulfur compounds already bound will again be released; said additive mixture including approximately one part by weight sodium carbonate, and approximately two parts by weight magnesium oxide; and for a burner firing, includes the step of adding said additive mixture into the periphery of the respective flames.

2. A method in combination according to claim 1, which includes the step of adding said additive mixture together with fuel prior to said combustion.

3. A method in combination according to claim 1, which includes the step of adding said additive mixture to said reaction products of said combustion by means of a carrier fluid.

4. A method in combination according to claim 3, which includes the step of adding said additive mixture to said reaction products of said combustion together with recycled flue dust at a temperature of less than 1200° C. and by means of a carrier fluid.

5. A method in combination according to claim 1, which includes the step of adding said additive mixture with a portion of an oxygen carrier.

6. A method in combination according to claim 1, which includes the step of adding said additive mixture with a mixture of oxygen carrier and flue gas.

7. A method in combination according to claim 1, which includes the step of adding said additive mixture by means of pure flue gas.

8. A method in combination according to claim 1, which includes the step of adding said additive mixture by means of water.

* * * * *